United States Patent
Gehring et al.

(10) Patent No.: US 6,623,060 B2
(45) Date of Patent: Sep. 23, 2003

(54) COLLAPSIBLE STORAGE APPARATUS FOR VEHICLE CARGO COMPARTMENTS

(75) Inventors: Thomas F. J. Gehring, Ontario (CA); Dejan Havidic, Toronto (CA); Ireneusz Jankowski, Scarborough (CA); Brian Flaman, Toronto (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/325,385

(22) Filed: Dec. 20, 2002

(65) Prior Publication Data

US 2003/0090121 A1 May 15, 2003

Related U.S. Application Data

(62) Division of application No. 09/899,747, filed on Jun. 25, 2001.
(60) Provisional application No. 60/214,947, filed on Jun. 29, 2000.

(51) Int. Cl.⁷ .................................................. B60R 7/00
(52) U.S. Cl. ................. 296/37.5; 296/37.8; 296/37.14; 296/37.16; 224/498; 224/42.34; 220/8
(58) Field of Search .............................. 296/37.1, 37.5, 296/37.8, 37.14, 37.16; 220/6, 8; 224/497, 498, 542, 543, 42.34, 42.35, 925

(56) References Cited

U.S. PATENT DOCUMENTS

| | | | | |
|---|---|---|---|---|
| 1,179,445 A | * | 4/1916 | Manning | 296/37.5 |
| 3,376,994 A | * | 4/1968 | Flinn, Jr. | 220/6 |
| 5,501,384 A | | 3/1996 | Wisniewski | 224/539 |
| 5,535,931 A | * | 7/1996 | Barlow et al. | 224/404 |
| 5,669,537 A | | 9/1997 | Saleem et al. | 224/539 |
| 5,810,186 A | * | 9/1998 | Lam | 220/1.5 |
| 5,810,413 A | * | 9/1998 | Siring et al. | 296/37.5 |
| 5,829,655 A | | 11/1998 | Salopek | 224/402 |
| 5,979,725 A | | 11/1999 | Lehrman | 224/539 |
| 6,015,071 A | * | 1/2000 | Adomeit et al. | 224/42.34 |
| 6,027,155 A | | 2/2000 | Wisniewski et al. | 296/37.1 |
| 6,050,202 A | * | 4/2000 | Thompson | 108/44 |
| 6,056,177 A | | 5/2000 | Schneider | 224/401 |
| 6,241,137 B1 | | 6/2001 | Corr | 224/542 |
| 6,244,802 B1 | | 6/2001 | Stanesic et al. | 410/94 |
| 6,247,741 B1 | * | 6/2001 | Seel et al. | 296/37.14 |
| 6,253,943 B1 | * | 7/2001 | Spykerman et al. | 220/6 |
| 6,375,055 B1 | * | 4/2002 | Spykerman et al. | 224/542 |

(List continued on next page.)

FOREIGN PATENT DOCUMENTS

| | | |
|---|---|---|
| DE | 43 40675 | 6/1995 |
| DE | 196 50767 | 7/1998 |
| DE | 198 37278 | 3/2000 |
| EP | 0864 466 | 9/1998 |
| EP | 0983 902 | 8/2000 |
| FR | 2 716 848 | 9/1995 |
| FR | 2 789 029 | 4/2000 |
| GB | 2 274 832 | 8/1994 |

*Primary Examiner*—Dennis H. Pedder
*Assistant Examiner*—Patricia L. Engle
(74) *Attorney, Agent, or Firm*—Myers Bigel Sibley & Sajovec

(57) ABSTRACT

Apparatus for storing items within vehicle compartments that can be manipulated into an operative position and a closed position with a single hand are provided. Apparatus includes a base, expandable walls, and a panel. The panel is pivotally attached to the base via the expandable walls and is movable between a closed position in overlying, face-to-face relation with the base and an oven position disposed substantially transverse to the base. The expandable walls each include a plurality of members pinned together at a first end and having opposite free ends. The members of each expandable wall are configured to move from a stacked relationship to a fanned relationship when the panel is moved from a closed position to an open position.

5 Claims, 17 Drawing Sheets

U.S. PATENT DOCUMENTS

| | | | |
|---|---|---|---|
| 6,488,168 B1 | * | 12/2002 | Wang .............................. 220/7 |
| 6,520,364 B2 | * | 2/2003 | Spykerman et al. ............ 220/6 |
| 2001/0020631 A1 | * | 9/2001 | Spykerman et al. ......... 224/539 |
| 2002/0000733 A1 | * | 1/2002 | Ryan .......................... 296/37.1 |
| 2002/0179601 A1 | * | 12/2002 | Haruhiro ....................... 220/6 |
| 2002/0179663 A1 | * | 12/2002 | Moore et al. ................ 224/539 |
| 2003/0071039 A1 | * | 4/2003 | Spykerman et al. ............ 220/6 |

\* cited by examiner

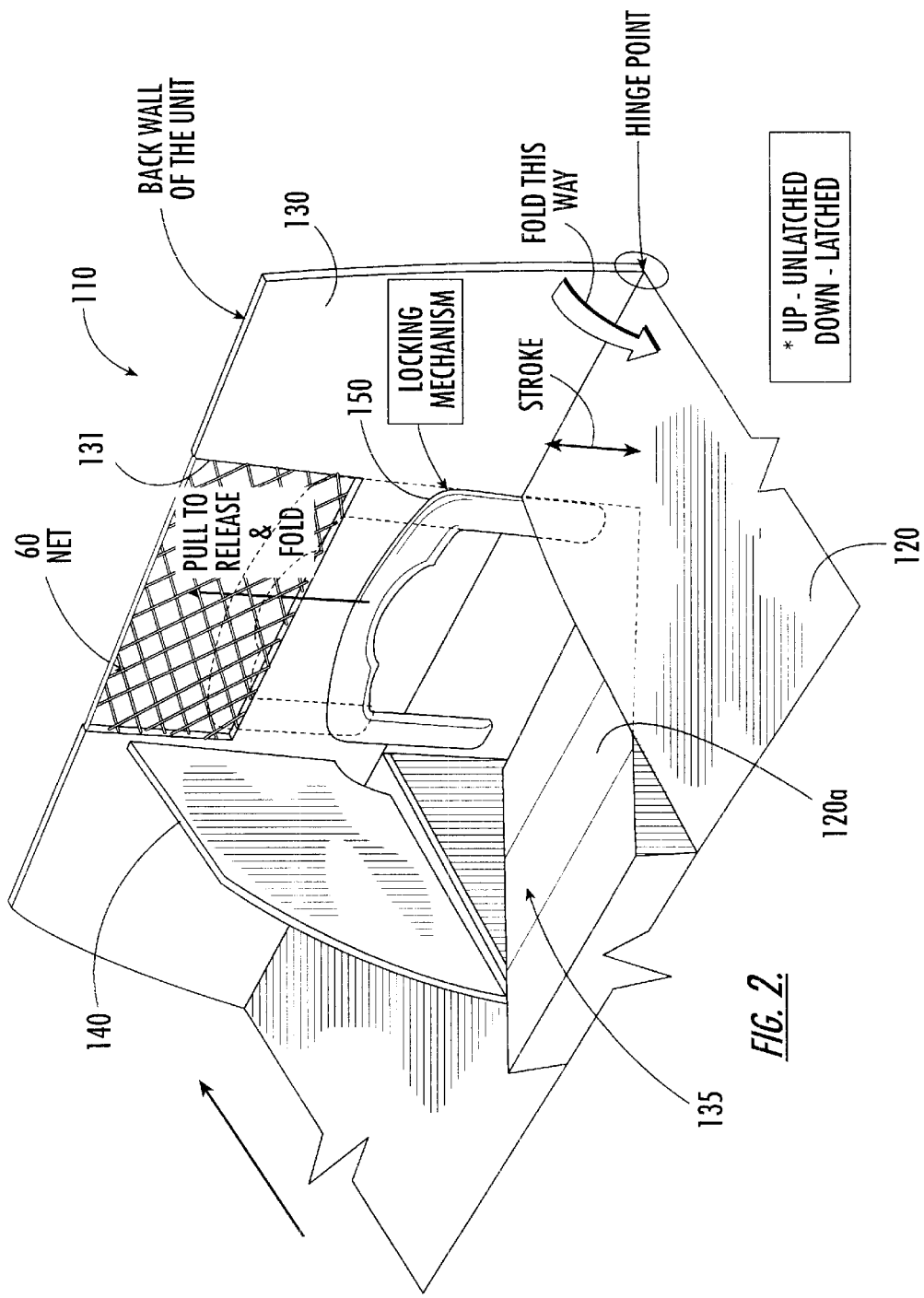

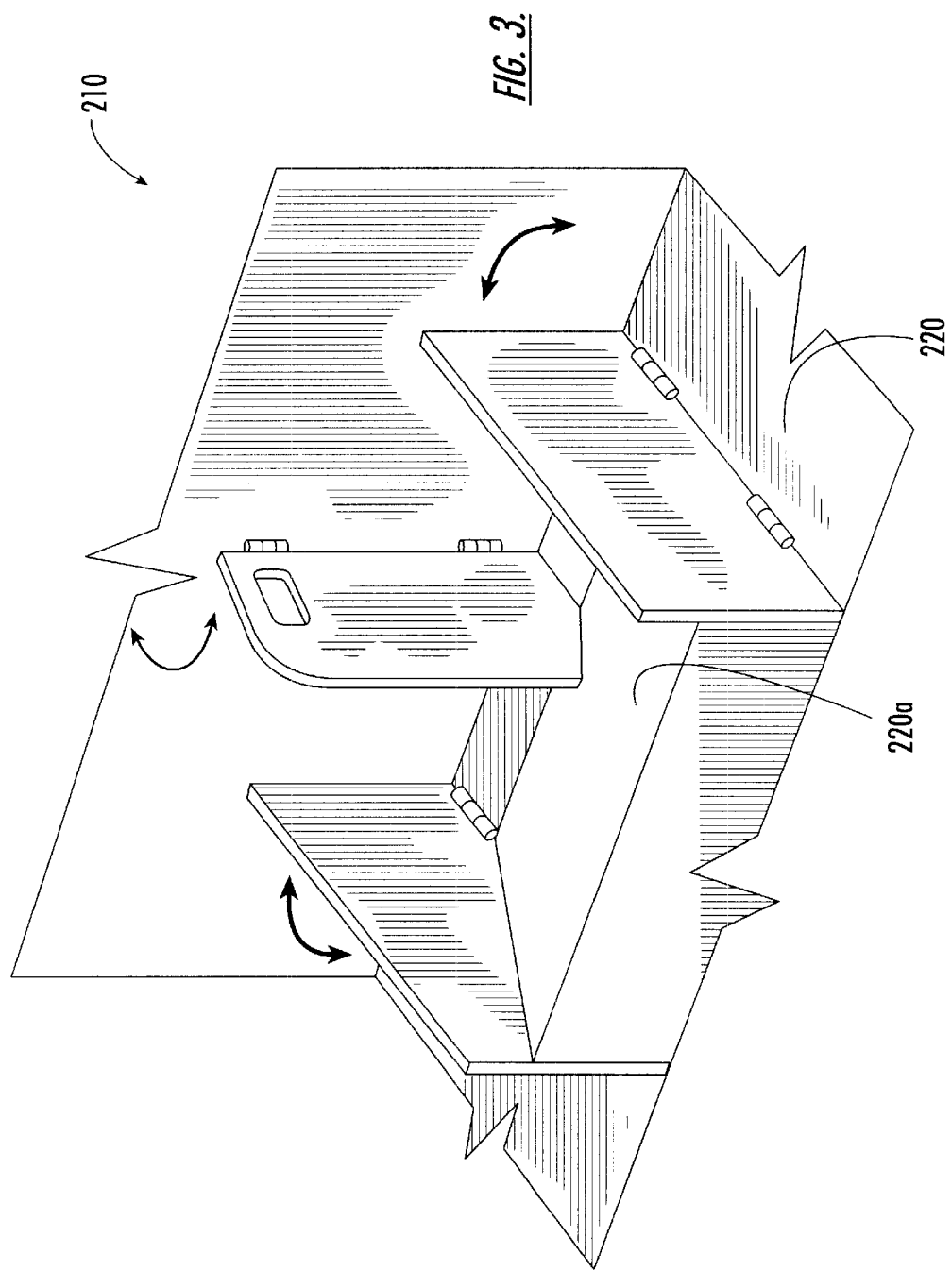

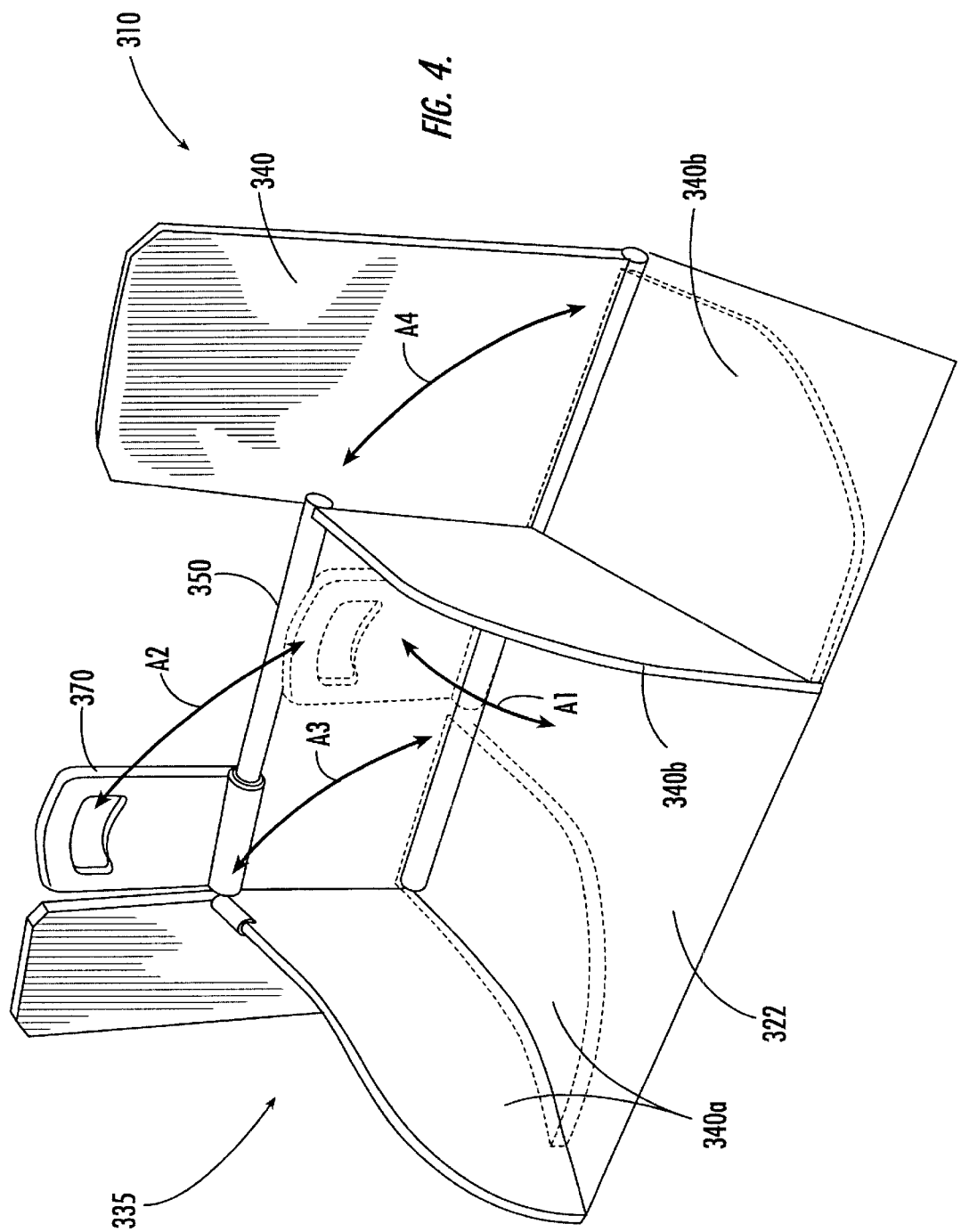

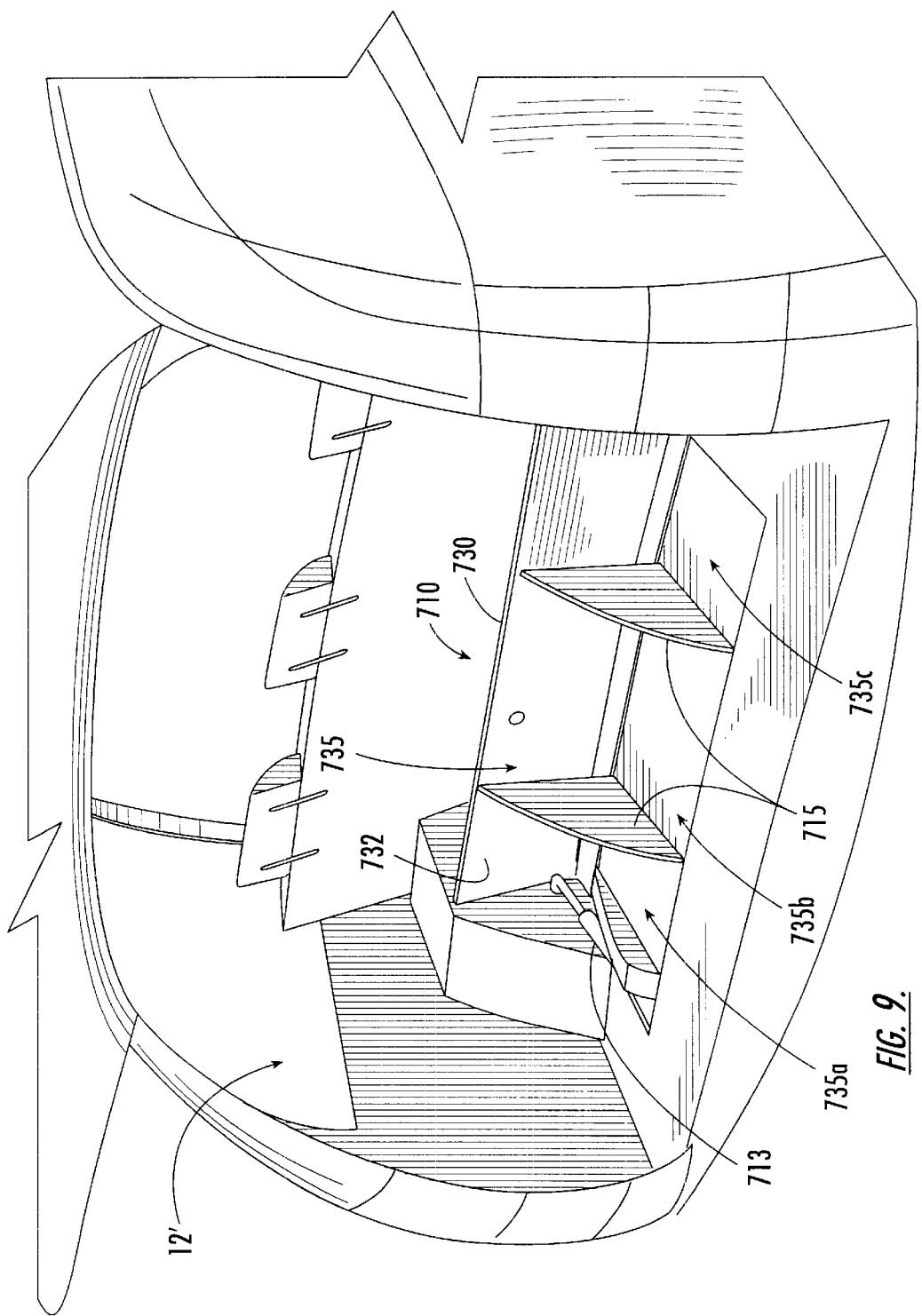

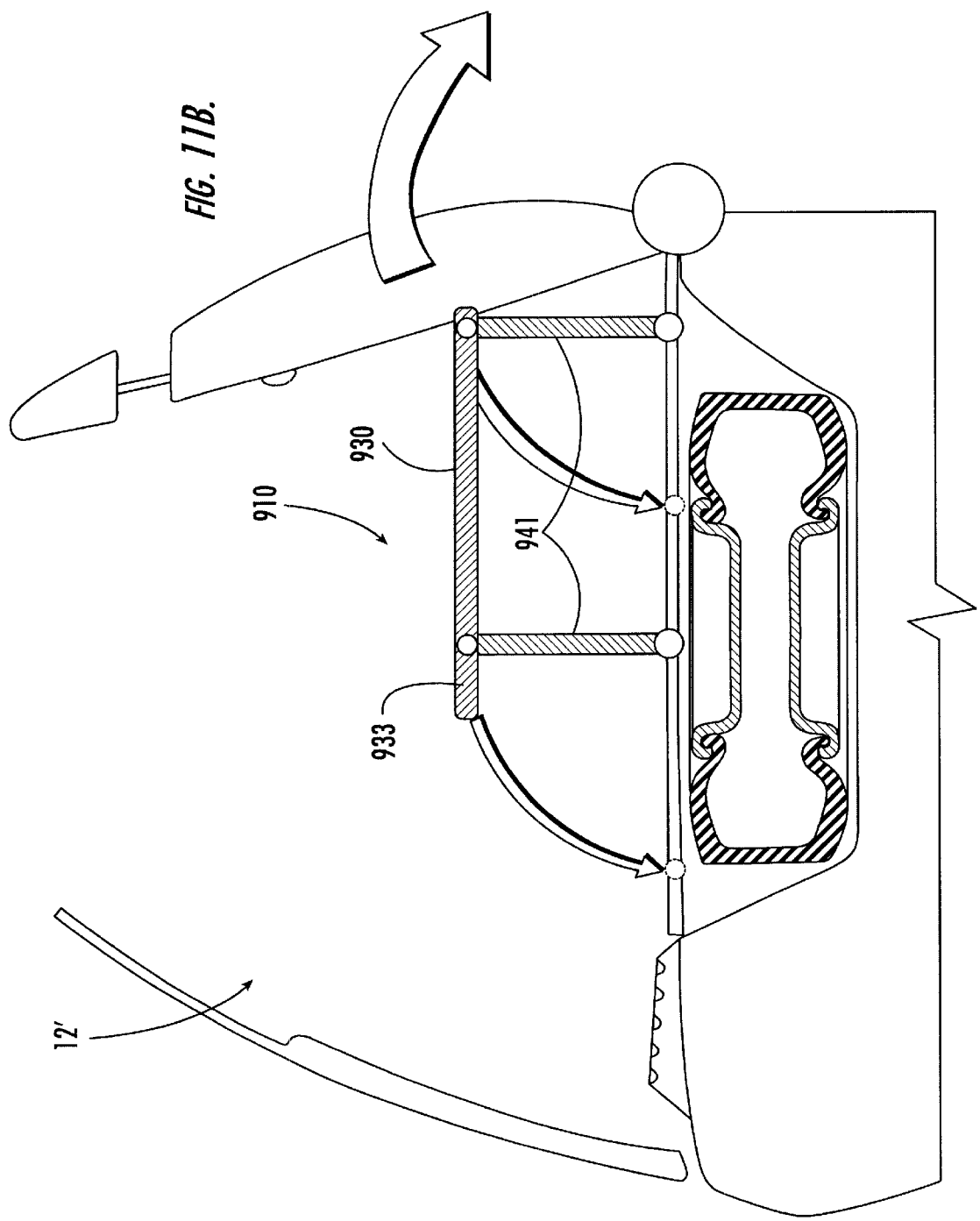

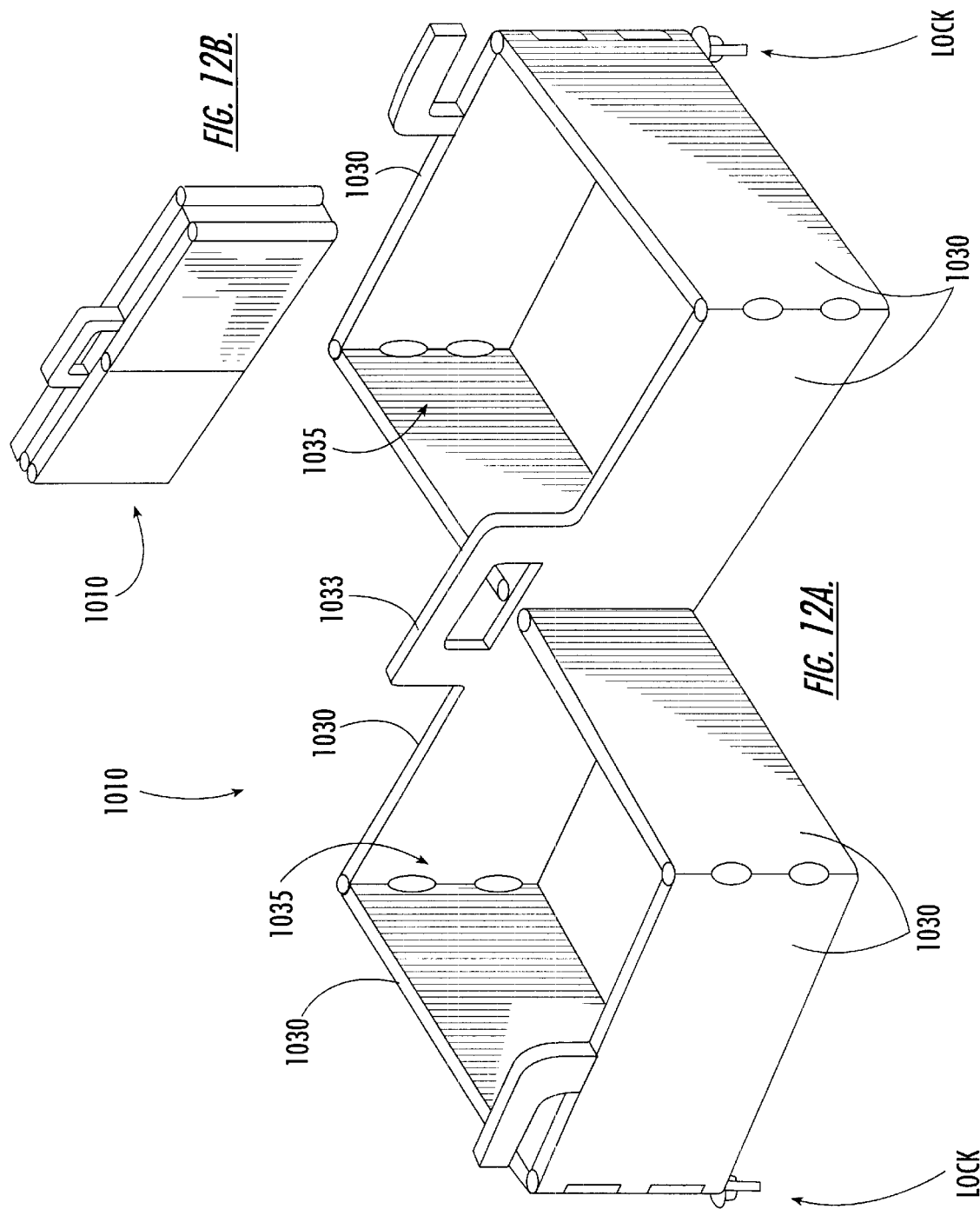

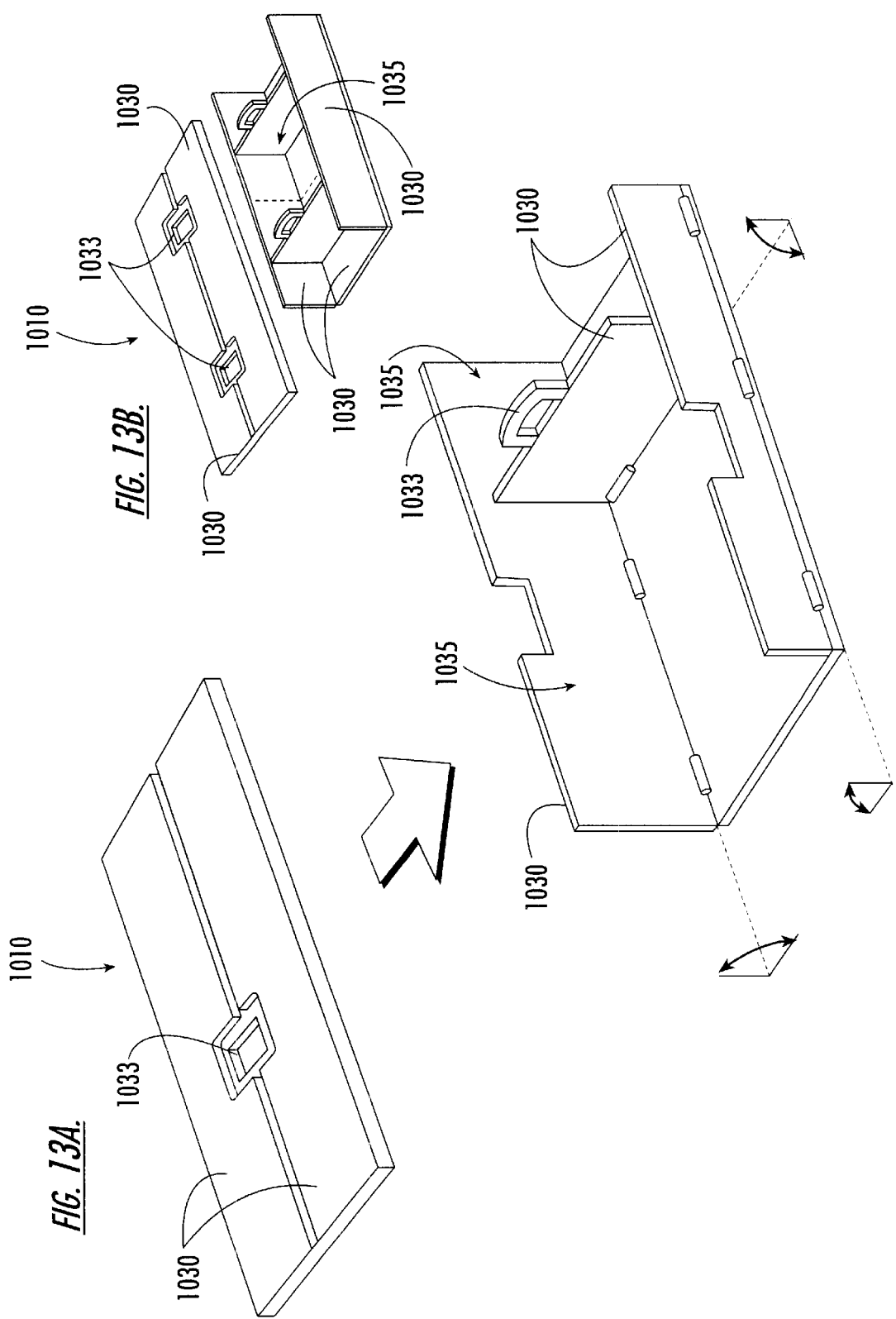

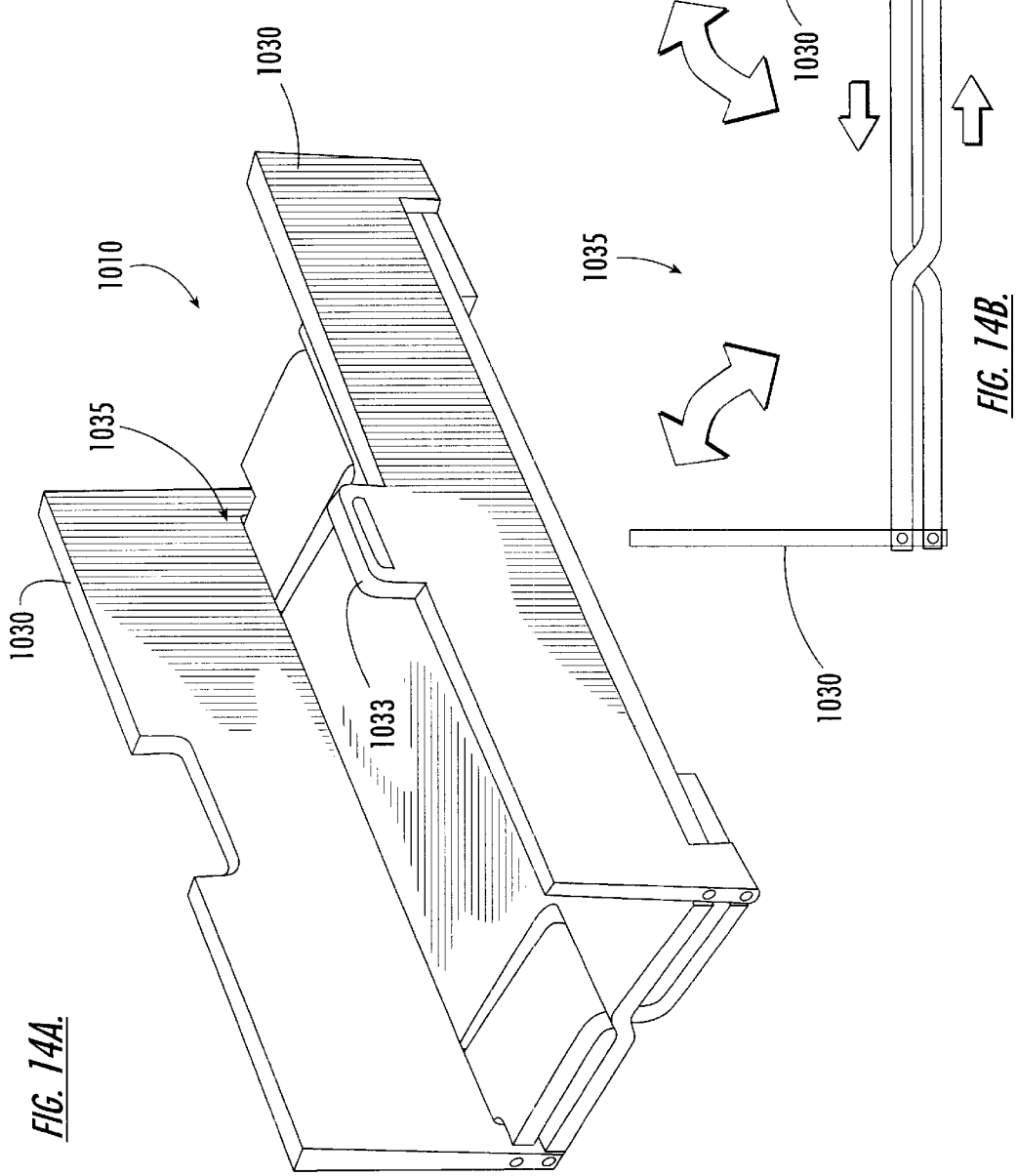

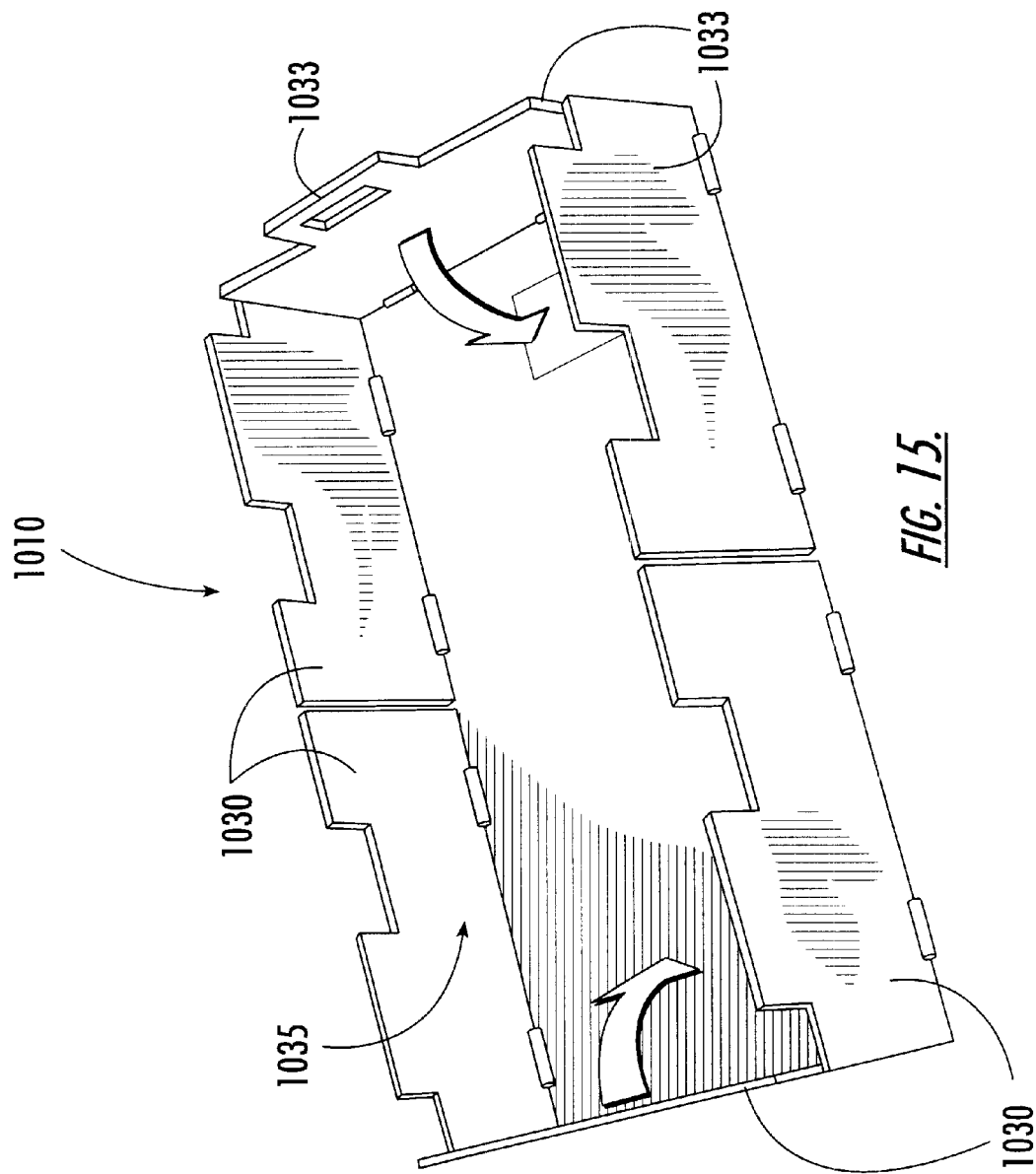

COLLAPSIBLE STORAGE APPARATUS FOR VEHICLE CARGO COMPARTMENTS

RELATED APPLICATION

This application is a Divisional application of U.S. patent application Ser. No. 09/899,747 filed Jun. 25, 2001, which is incorporated herein by reference in its entirety.

RELATED APPLICATIONS

This application claims the benefit of U.S. Provisional Application No. 60/214,947, filed Jun. 29, 2000, the disclosure of which is incorporated herein by reference in its entirety as if set forth fully herein.

FIELD OF THE INVENTION

The present invention relates generally to vehicles and, more particularly, to cargo management apparatus for use within vehicles.

BACKGROUND OF THE INVENTION

Motor vehicles are typically provided with a cargo storage compartment of some type. For example, sedan-style automobiles are conventionally equipped with a trunk. Sport/utility and mini-van vehicles, in which there are two or more rows of seating, are conventionally provided with a cargo storage area behind the last row of seating.

Items carried within vehicle cargo storage areas are often free to move about during vehicle operation, which may be undesirable. Cargo netting may be used to restrain items from movement within vehicle cargo storage compartments. While such netting may adequately restrain items from movement, cargo netting may require the use of two hands to hold the cargo netting back while placing items therewithin, which may be cumbersome.

Various devices are known for dividing vehicle storage compartments to prevent movement of items stored therein. For example, U.S. Pat. No. 6,027,155 to Wisniewski et al. describes a storage system for a vehicle cargo compartment that includes a cover that is removably attached to the floor of the cargo compartment and that is configured to rotate between open and closed positions. U.S. Pat. No. 5,669,537 to Saleem et al. describes a storage unit that extends between, and connects to, vehicle panels of a vehicle storage area. U.S. Pat. No. 5,501,384 to Wisniewski describes a storage system for a vehicle that includes a molded bin and a cover pivotally secured to the bin.

Unfortunately, these devices are somewhat complex and bulky and are not adapted to be compactly stored within the cargo storage area of a vehicle. Moreover, in automotive vehicles such as sport/utility vehicles and mini-vans, cargo storage space maybe somewhat limited. Accordingly, a need exists for a cargo storage device that can securely retain items within a cargo storage area during operation of a vehicle and that can be easily stored in an out-of-the-way location when not needed, and without requiring that the storage device be removed from the cargo storage area. In addition, a need exists to maximize the efficiency and utilization of existing cargo storage space without intruding on passenger space.

SUMMARY OF THE INVENTION

In view of the above discussion, collapsible storage apparatus for use within vehicle compartments (e.g., automobile trunks, mini-van and SUV cargo areas, and the like) are provided. According to embodiments of the present invention a storage apparatus may include a base disposed on a vehicle compartment floor (or covering on the floor). The base includes a surface that is at least partially exposed to the vehicle compartment when the apparatus is in an operative position. The base may have a generally flat configuration and/or may have one or more portions thereof that have a sloped orientation relative to horizontal. A rear panel is pivotally attached to the base and is movable between a closed position wherein the rear panel is in overlying, face-to-face relation with the base surface and an open position wherein the rear panel is disposed substantially normal to the base surface. In the open position, the rear panel and base surface define a storage compartment for receiving items therein.

According to embodiments of the present invention, the base may be disposed at least partially beneath a vehicle compartment floor such that the rear panel is substantially flush with the floor when the rear panel is in a closed position. According to embodiments of the present invention, the base may be disposed on the floor covering such that the rear panel rests on top of the floor covering when in the closed position.

Embodiments of the present invention do not require a separate element as a base. The floor or floor covering within a vehicle compartment may serve as a "base." Moreover, embodiments of the present invention do not require that the rear panel be substantially flush with the floor (or floor covering) of a vehicle when in a closed position as described herein.

According to embodiments of the present invention, floor covering material may be disposed on the vehicle compartment floor and on a rear side of the rear panel and may serve as a hinge. The base may be disposed sufficiently beneath the vehicle compartment floor such that the rear panel and floor covering disposed thereon are substantially flush with the vehicle compartment floor and floor covering when the rear panel is in the closed position.

According to embodiments of the present invention, end panels are movably attached to respective end portions of the rear panel. The end panels are movable between a stored position in face-to-face relation with the rear-panel and an operative position disposed substantially normal to the base surface and to the rear panel. The end panels move from their respective stored positions to operative positions in response to movement of the rear panel from its closed position to its open position. Alternatively, the end panels may be pivotally attached to the base surface and are movable between a stored position in face-to-face relation with the base surface and an operative position disposed substantially normal to the base surface and to the rear panel.

According to embodiments of the present invention, one or more partition panels that are movably attached to either the rear panel or to the base surface, may be provided. Each partition panel divides the compartment into multiple sections when in the operative position. Each partition panel is movable between a stored position in face-to-face relation with the rear panel (or base surface) and an operative position disposed substantially normal to the base surface and to the rear panel. Each partition panel may move from its closed position to its open position in response to movement of the rear panel from its closed position to its open position. Alternatively, movement of a partition panel may be independent of movement of the rear panel. According to other embodiments of the present invention, one or more partition panels may be removable and may have be configured to be installed relative to a rear panel in various different positions.

According to embodiments of the present invention, a handle may be attached to the partition panel (or to the rear panel) that is configured to be grasped by a user and used to move the rear panel from the closed position to the open position, thereby causing the partition panel and/or end panels to move to their respective operative positions to form compartments for receiving items therein.

According to additional embodiments of the present invention, one or more projections (e.g., hooks) may be provided and may extend from the rear panel. Each such projection is configured to support articles suspended therefrom, such as loaded grocery bags, and the like.

According to additional embodiments of the present invention, cargo netting configured to enclose the compartment and items stored therewithin, may be attached to the rear panel.

According to embodiments of the present invention, one or more locking members and/or springs may be provided to maintain the rear panel in an open position. Opening of a rear panel may also be assisted via the use of biasing devices including, but not limited to, springs, telescoping struts, dampeners, and the like.

According to additional embodiments of the present invention, a storage apparatus may include a plurality of elongate panels pivotally attached within a vehicle compartment in adjacent, spaced-apart relationship, and that define a plurality of storage compartments. The panels are collectively movable between closed and open positions. In the closed position, the front side of each panel is in overlying, face-to-face relation with the vehicle floor (or base or floor covering). In the open position, the panels are collectively disposed substantially transverse to the vehicle floor (or base or floor covering) to define a plurality of storage compartments for receiving items therein.

According to additional embodiments of the present invention, an apparatus for storing items within a vehicle compartment includes an elongate panel pivotally attached to the vehicle compartment floor (or floor covering or base) via leg members. The panel is movable between a stored position in face-to-face contacting relation with the floor (or base or floor covering) and an operative position wherein the panel is in spaced-apart, face-to-face relation with the floor (or base or floor covering). In the operative position, the panel can serve the function of a table and/or shelf.

Collapsible apparatus according to embodiments of the present invention are configured for single-handed manipulation from a collapsed (i.e., closed) position to an unfolded (i.e., open) position, and vice-versa. An apparatus according to the present invention is moved from a stored position and snapped into an open position with one easy motion by lifting and rotating a handle. The rear panel, end walls, and partition panel are configured to snap into a locked orientation such that they remain firmly in place until it is desired to close the apparatus. When an apparatus according to embodiments of the present invention is no longer desired for use in storing items therein, the above procedures can be reversed. Accordingly, apparatus according to embodiments of the present invention can be moved quickly and easily from stored, closed positions to open, operative positions.

According to additional embodiments of the present invention, a collapsible apparatus for storing items within a vehicle compartment includes a base, first and second expandable walls, and a panel. The panel is pivotally attached to the base and is connected to the respective first and second expandable walls. The panel is movable between a closed position in overlying, face-to-face relation with the base and an open position disposed substantially transverse to the base. According to embodiments of the present invention, the panel may include an aperture formed therethrough with cargo netting overlying the aperture.

Vehicle storage apparatus according to embodiments of the present invention can be integral with a floor covering and fabricated, at least in part, from the same material as the floor covering within a vehicle compartment, thus allowing the apparatus to be folded over the floor covering with little change in the appearance of the floor covering.

Moreover, storage devices according to embodiments of the present invention can be quickly folded into a flat position such that the storage device is out of the way when not in use and/or when larger devices need to be stored within the cargo storage area.

BRIEF DESCRIPTION OF THE DRAWINGS

FIG. 2 is a perspective view of a collapsible storage apparatus for storing items within a vehicle compartment, according to other embodiments of the present invention.

FIG. 3 is a perspective view of a collapsible storage apparatus for storing items within a vehicle compartment, according to other embodiments of the present invention.

FIG. 4 is a perspective view of a collapsible storage apparatus for storing items within a vehicle compartment, according to other embodiments of the present invention.

FIGS. 5A–5B are perspective views of a collapsible storage apparatus for storing items within a vehicle compartment, according to other embodiments of the present invention, wherein FIG. 5A illustrates the apparatus in a closed position and FIG. 5B illustrates the apparatus in an open position.

FIGS. 6A–6B are side views of the apparatus of FIGS. 5A–5B illustrating a locking member configured to releasably secure the movable panel in an open position, wherein FIG. 6A illustrates the locking member in a locked position so as to prevent movement of the panel towards the base, and wherein FIG. 6B illustrates a force being applied to the second ends of the first and second arms to cause the locking member to allow the panel to move towards the base to a closed position.

FIGS. 7A–7B are perspective views of a collapsible storage apparatus for storing items within a vehicle compartment, according to other embodiments of the present invention, wherein FIG. 7A illustrates the apparatus in a closed position and FIG. 7B illustrates the apparatus in an open position.

FIGS. 8A–8B are perspective views of a collapsible storage apparatus for storing items within a vehicle compartment, according to other embodiments of the present invention, wherein FIG. 8A illustrates the apparatus in a closed position and FIG. 8B illustrates the apparatus in an open position.

FIG. 9 is a perspective view of a collapsible storage apparatus for storing items within a vehicle compartment, according to additional embodiments of the present invention.

FIG. 11B is a side view of the collapsible storage apparatus of FIG. 11A.

FIGS. 12A–12B, 13A–13B, 14A–14B, and 15 illustrate collapsible storage apparatus according to other embodiments of the present invention.

DETAILED DESCRIPTION OF THE INVENTION

Figure 1:
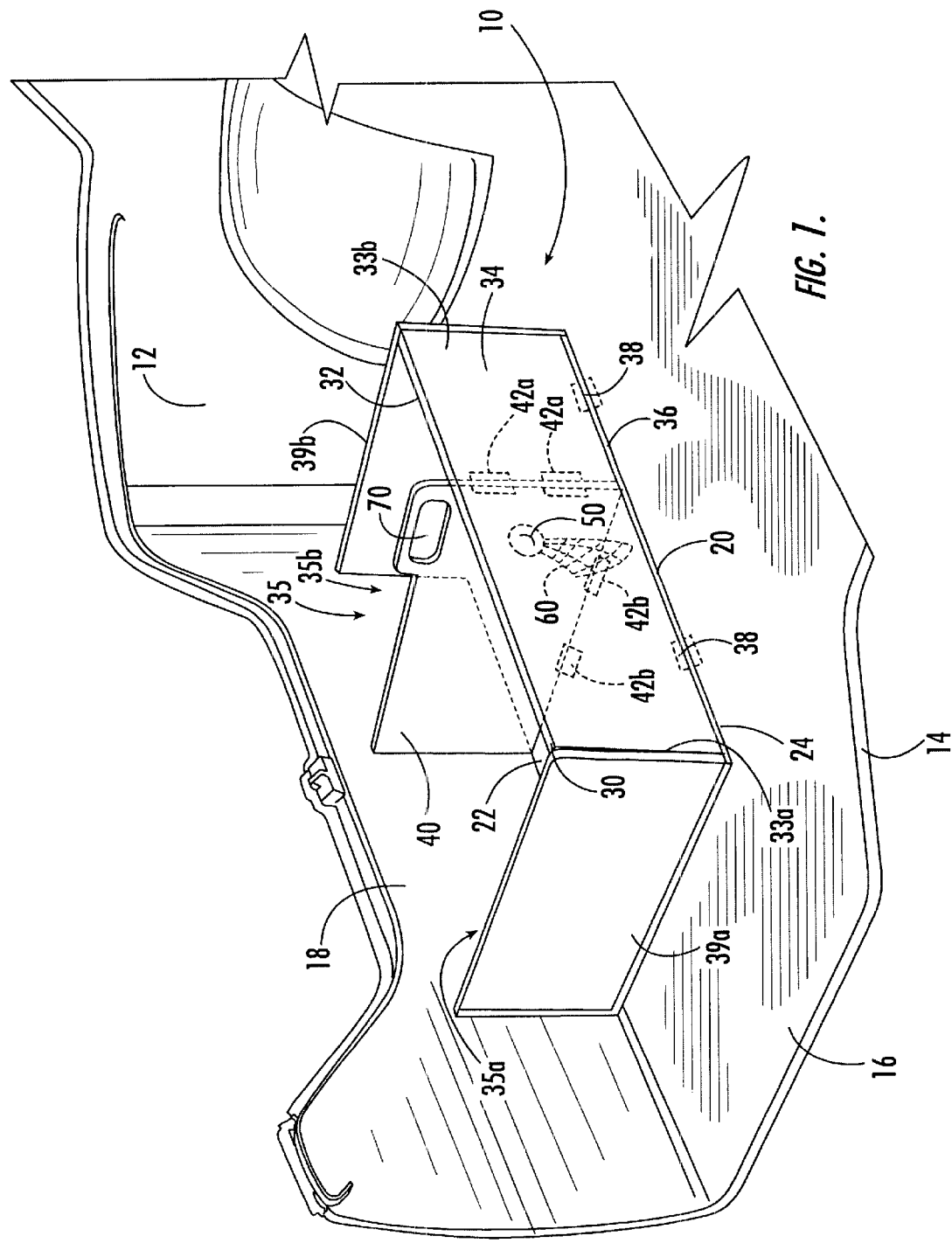
FIG. 1 is a perspective view of a collapsible storage apparatus for storing items within a vehicle compartment, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings; the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring to FIG. 1, a collapsible storage apparatus 10 for storing items within a vehicle compartment 12, according to embodiments of the present invention is illustrated. The illustrated vehicle compartment 12 is a trunk of an automobile. However, it is understood that embodiments of the present invention may be utilized in various compartments of various vehicles, such as the rear storage area of a mini-van, truck, and/or sport utility vehicle, without limitation. The illustrated vehicle compartment 12 includes a load floor (hereinafter "floor") 14 having a floor covering (e.g., carpet, mat, etc.) 16 and at least one side wall 18 extending substantially vertically from the floor 14. The illustrated vehicle compartment 12 is partially defined by the floor 14 and the side wall 18. Other walls, seat back, and package tray (not shown) may further define the vehicle compartment 12.

The illustrated apparatus 10 includes a base 20 disposed on or at least partially below the floor 14 and having a surface 22 that is at least partially exposed to the vehicle compartment 12 when the apparatus 10 is in an operative (i.e., open) position. The base 20 may be disposed at or below the floor covering 16. The illustrated base 20 has a generally rectangular shape, occupies substantially less than the entire floor covering 16, and is disposed adjacent the side wall 18. However, the base 20 may have any size and shape, such as circular, oval, or square, and can be positioned anywhere within the vehicle compartment 12. When the base 20 is disposed below the floor covering 16, the floor covering 16 includes an opening 24 such that at least a portion of the surface 22 is exposed to the vehicle compartment 12 when the apparatus 10 is in an operative (i.e., open) position.

The base 20 may have a generally flat configuration and/or may have one or more portions thereof that have a sloped orientation relative to horizontal. For certain installations, the base 20 may conform to the configuration of the sheet metal in the vehicle compartment. FIGS. 2 and 3 illustrate storage apparatus 110, 210 according to alternative embodiments wherein the bases 120, 220 include portions 120a, 220a having sloped configurations.

According to embodiments of the present invention, a floor covering within a compartment may serve the function of a "base." As such, a rear panel may be pivotally attached to the floor covering. Accordingly, it is to be understood that base 20 may be a separate element or may be a floor covering or may be the floor itself.

Referring back to FIG. 1, the illustrated apparatus 10 includes a rear panel 30 pivotally attached to the base 20 via one or more hinges 38 and having opposite front and rear sides 32, 34 and opposite first and second end portions 33a, 33b. The rear panel 30 is movable between a closed position wherein the front side 32 is in overlying, face-to-face relation with the base surface 22 and an open position wherein the rear panel 30 is disposed substantially normal to the base surface 22. In the open position, the rear panel 30 and base surface 22 (along with the end panels 39a, 39b described below) define a storage compartment 35 for receiving items therein.

The base 20 may be disposed at least partially beneath the floor 14 such that the rear panel 30 is substantially flush with the floor 14 when the rear panel 30 is in the closed position. According to embodiments of the present invention, the base 20 may be disposed on the floor covering 16 such that the rear panel 30 rests on top of the floor covering 16 when in the closed position.

A hinge of virtually any type may be utilized to pivotally attach the rear panel 30 to the base 20 (or to the floor 14 or other vehicle component adjacent to the base 20). According to embodiments of the present invention, the floor covering 16 (e.g., carpeting) may be disposed on the floor 14 and on the rear side 34 of the rear panel 30 and may serve as a hinge. The base 20 may be disposed sufficiently beneath the floor 14 such that the rear panel 30 and floor covering 16 disposed thereon is substantially flush with the floor 14 when the rear panel 30 is in the closed position. Accordingly, the apparatus 10 may appear integral with a vehicle compartment floor 14 when the rear panel 30 is in the closed position.

However, it is to be understood that embodiments of the present invention need not be flush with a vehicle compartment floor or floor covering. Moreover, embodiments of the present invention may be configured to lie directly on top of a floor or floor covering.

Still referring to the embodiment illustrated in FIG. 1, first and second end panels 39a, 39b are movably attached to the first and second end portions 33a, 33b of the rear panel 30. The first and second end panels 39a, 39b are movable between a stored position in face-to-face relation with the rear panel front side 32 and an operative position disposed substantially normal to the base surface 22 and to the rear panel 30. The first and second end panels 39a, 39b move from their respective stored positions to operative positions in response to movement of the rear panel 30 from its closed position to its open position. The first and second end panels 39a, 39b together with the base surface 22 and rear panel 30 define a storage compartment 35 for receiving items therein.

According to embodiments of the present invention, the first and second end panels 39a, 39b may be pivotally attached to the base surface 22 and are movable between a stored position in face-to-face relation with the base surface 22 and an operative position disposed substantially normal to the base surface 22 and to the rear panel 30. Even if attached directly to the base surface 22 (or adjacent thereto), the first and second end panels 39a, 39b move from their respective stored positions to operative positions in response to movement of the rear panel 30 from its closed position to its open position.

Still referring to FIG. 1, the illustrated apparatus 10 also includes a partition panel 40 that is movably attached to the front side 32 of the rear panel 30. The partition panel 40 is movable between a stored position in face-to-face relation with the rear panel front side 32 and an operative position disposed substantially normal to the base surface 22 and to the rear panel 30. The partition panel 40 may move from its closed position to its open position in response to movement of the rear panel 30 from its closed position to its open position. Alternatively, movement of the partition panel 40 may be independent of movement of the rear panel 30. The partition panel 40 divides the compartment 35 into multiple sections 35a, 35b when in the operative position.

In the illustrated embodiment, the partition panel 40 is generally parallel with the first and second end panels 39a, 39b when the apparatus 10 is in an open position. Although only a single partition panel 40 is illustrated, it is understood that multiple partition panels may be utilized according to embodiments of the present invention.

The partition panel 40 may be movably attached to the front side 32 of the rear panel 30 via one or more hinges 42a. Alternatively, the partition panel 40 may be movably attached to the base surface 22 via one or more hinges 42b. A hinge of virtually any type may be utilized to movably attach the partition panel 40 to either the rear panel front side 32 or to the base surface 22. Embodiments of the present invention are not limited to a particular type of hinge.

Still referring to FIG. 1, a handle 70 is attached to the partition panel 40 and is configured to be grasped by a user and used to move the rear panel 30 from the closed position to the open position, thereby causing the end panels 39a, 39b to move to their respective operative positions to form a compartment 35 for receiving items therein. The handle 70 may then be used to move the partition panel 40 to its operative position to form compartments 35a, 35b. According to alternative embodiments of the present invention, the handle 70 may be attached to the rear panel 30. Handles having various shapes and configurations may be utilized in accordance with embodiments of the present invention. Moreover, handles may be located on the partition panel 40 and/or on the rear panel 30 in various locations. It is to be understood that embodiments of the present invention do not require a handle (i.e., handles are optional).

According to additional embodiments of the present invention, one or more projections 50 (e.g., hooks) may be provided and may extend from the rear panel front side 32 as illustrated in FIG. 1. Each such projection 50 is configured to support articles suspended therefrom, such as loaded grocery bags, and the like.

According to additional embodiments of the present invention, cargo netting 60 configured to enclose the compartment 35 and/or compartments 35a, 35b and items stored therewithin, may be attached to the rear panel 30 as illustrated in FIG. 1.

In operation, when it is desired to load and transport items in the vehicle compartment 12 of a vehicle having the collapsible apparatus 10 of FIG. 1 installed therein, the apparatus 10 is moved from the stored position and snapped into the open position with one easy motion of the handle 70. According to embodiments of the present invention, the rear panel 40, end walls 39a, 39b, and partition panel 40 are configured to snap into a locked orientation such that they remain firmly in place until it is desired to close the apparatus 10.

Movement of the partition panel 40 from a stored position to an operative position may cause the rear panel 30 to move from the closed position to the open position which, in turn, causes the first and second end panels 39a, 39b to move from the respective stored positions to the respective operative positions. Alternatively, movement of the rear panel 30 from a stored position to an operative position may cause the first and second end panels 39a, 39b to move from the respective stored positions to the respective operative positions. Operation of the partition panel 40 may be independent of movement of the rear panel 30.

When the apparatus 10 is no longer desired for use in storing items therein, the above procedures can be reversed. For example, any additional partition panels may be pivoted such that they are disposed against either the base surface 22 or the rear panel front side 32, and then the rear panel 30 can be moved to a closed position, thereby causing the end panels 39a, 39b to move to their closed positions. Accordingly, apparatus according to embodiments of the present invention can be moved quickly and easily from stored, closed positions to open, operative positions.

Referring to FIG. 2, a collapsible storage apparatus 110 for storing items within a vehicle compartment, according to alternative embodiments of the present invention is illustrated. The illustrated apparatus 110 includes a base 120 having a portion 120a that has a sloped configuration. A rear panel 130 is movably attached to the base 120 and includes an opening 131 formed in a portion thereof, as illustrated. Cargo netting 60 extends across the rear panel opening 131 and allows a user to place items within the compartment 135 formed by the rear panel 130 and base sloped portion 120a. A partition panel 140 is also provided that is movably secured either to the rear panel 130 or to the base 120. As described above, the partition panel 140 is movable between a stored position and an operative position.

A locking member 150 is also provided that is configured to maintain the rear panel 130 of the apparatus 110 in the open position. The illustrated locking member 150 is configured to move upwardly and downwardly relative to the base 120. When the rear panel 130 is moved to the open position, the locking member 150 is moved downwardly to maintain the rear panel 130 in the open position. To lower the rear panel 130 to the closed position, the locking member 150 is moved upwardly, which then allows the rear panel 130 to pivot. Various types of locking member having various configurations may be utilized in accordance with embodiments of the present invention. Embodiments of the present invention are not limited to the illustrated locking member 150.

Referring to FIG. 4, a collapsible storage apparatus 310 for storing items within a vehicle compartment, according to alternative embodiments of the present invention is illustrated. The illustrated apparatus 310 includes a pair of partition panels 340a, 340b movably attached to a base surface 322 (or adjacent thereto) in adjacent, spaced-apart relationship. Each partition panel 340a, 340b is movable between a stored position in face-to-face relation with the base surface 322 and an operative position disposed substantially normal to the base surface 322 and to the rear panel 340 so as to divide the compartment 335 into multiple sections. A handle 370 is rotatably connected to the pair of partition panels 340a, 340b via member 350. The handle 370 is configured to be grasped by a user and to move the partition panels 340a, 340b from the stored positions to the operative positions.

To move the partition panels 340a, 340b from a stored position to an operative position, a user grasps the handle 370 which is lying in face-to-face relation with the base surface 322, rotates the handle 370 as indicated by arrow A1 and pulls upwardly as indicated by arrow A2. The partition panels 340a, 340b follow the movement indicated by arrow A2 and move to an operative position as indicated by arrows A3 and A4, respectively.

When not needed, the partition panels 340a, 340b can be returned to a stored position by reversing the above operations. According to embodiments of the present invention, the partition panels 340a, 340b and handle 370 may be maintained in a flush-mounted configuration within the base 322 when stored. However, it is not required that the partition panels 340a, 340b and handle 370 are maintained in a flush-mounted configuration within the base 322 when stored.

Figure 5A:
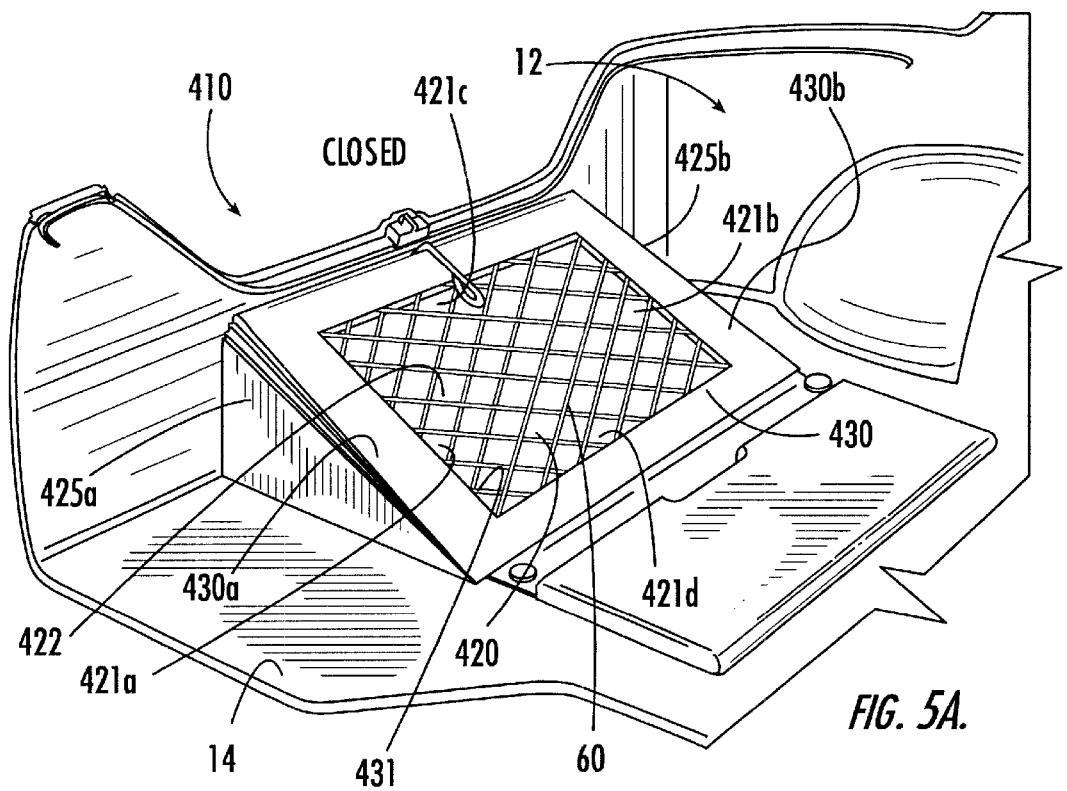
Figure 5B:
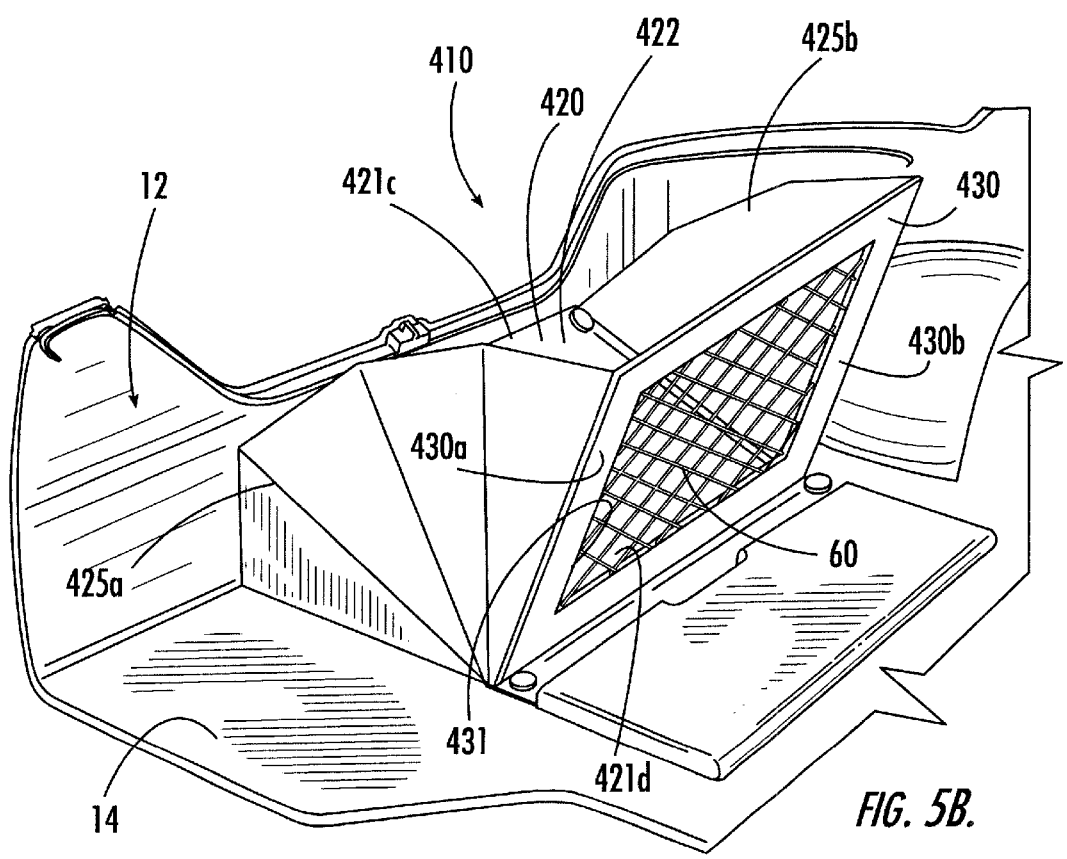

Referring now to FIGS. 5A–5B, a collapsible storage apparatus 410 for storing items within a vehicle compartment 12, according to other embodiments of the present invention, is illustrated. The apparatus 410 includes a base 420 disposed on the floor 14 of a vehicle compartment 12. The base 420 includes opposite first and second end portions 421a, 421b, opposite first and second edge portions 421c, 421d, and a surface 422 exposed to the vehicle compartment 12. First and second expandable walls 425a, 425b extend from the base surface adjacent the respective first and second end portions 421a, 421b and are attached to a panel 430.

The panel 430 is pivotally attached to the base 420 and includes opposite first and second end portions 430a, 430b. The panel first and second end portions 430a, 430b are connected to the respective first and second expandable walls 425a, 425b. The illustrated panel 430 includes an aperture 431 formed therethrough with cargo netting 60 overlying the aperture 431.

The panel 430 is movable between a closed position in overlying, face-to-face relation with the base surface 422 (FIG. 5A) and an open position disposed substantially transverse to the base surface 422 (FIG. 5B). The base 422, first and second expandable walls 425a, 425b, and panel 430 define one or more storage compartments for receiving items therein.

The illustrated expandable walls 425a, 425b each include a plurality of members 426 pinned together at a first end 426a and having opposite free ends 426b. The members 426 of each expandable wall 425a, 425b are configured to move from a stacked relationship (FIG. 5A) to a fanned relationship (FIG. 5B) when the panel 430 is moved from a closed position (FIG. 5A) to an open position (FIG. 5B).

Embodiments of the present invention are not limited to the illustrated expandable walls 425a, 425b. Expandable and collapsible walls of various types and configurations may be utilized (e.g., telescoping walls; walls having accordion-type bellows; etc.).

Figure 6B:
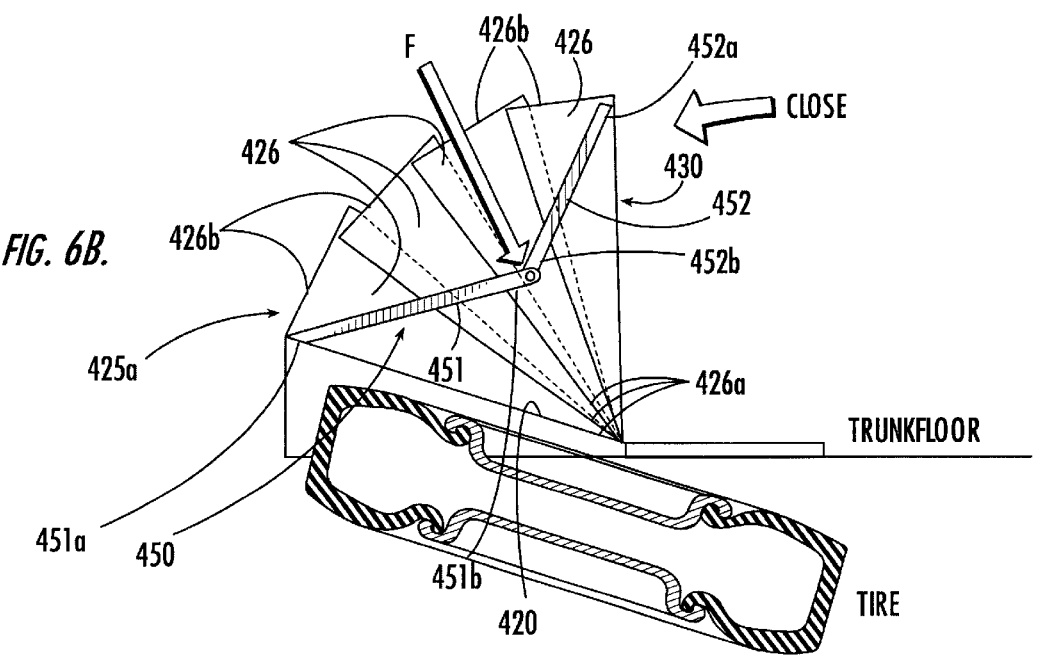
Figure 6A:
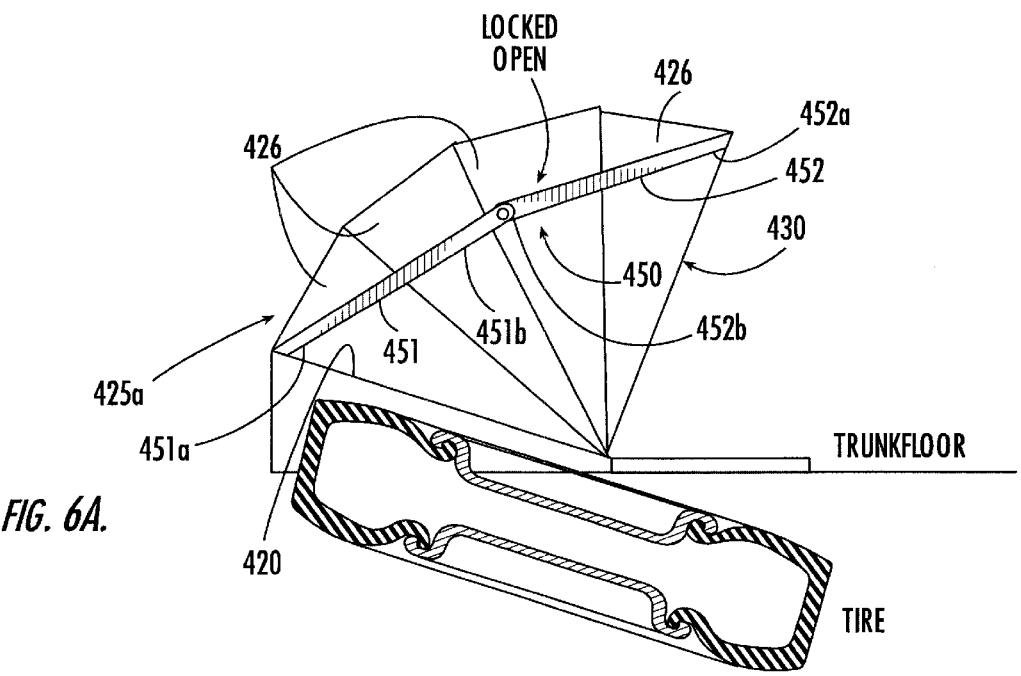

As illustrated in FIGS. 6A–6B, a locking member 450 is provided to releasably secure the panel 430 in an open position. A locking member 450 may be provided for each expandable wall 425a, 425b, or for just one expandable wall (i.e., 425a or 425b). The illustrated locking member 450 includes first and second elongated arms 451, 452, each having opposite first and second ends 451a, 451b, 452a, 452b. The first arm first end 451a is pivotally attached to the base 420, or adjacent thereto. The second arm first end 452a is pivotally attached to the panel 430. The second ends 451b, 452b of the first and second arms 451, 452 are pivotally attached together.

To lock the panel 430 in an open position, the second ends 451b, 452b of first and second arms 451, 452 are pulled upwardly such that the configuration of the locking member 450 prevents movement of the panel 430 towards the base 420 (FIG. 6A). To unlock the panel 430 from an open position and permit the panel 430 to move to a closed position, a downwardly force F is applied to the second ends 451b, 452b of first and second arms 451, 452, as illustrated in FIG. 6B. The members 426 of each expandable wall 425a, 425b can then move from a fanned relationship to a stacked relationship as the panel 430 is moved to a closed position.

Figure 7A:
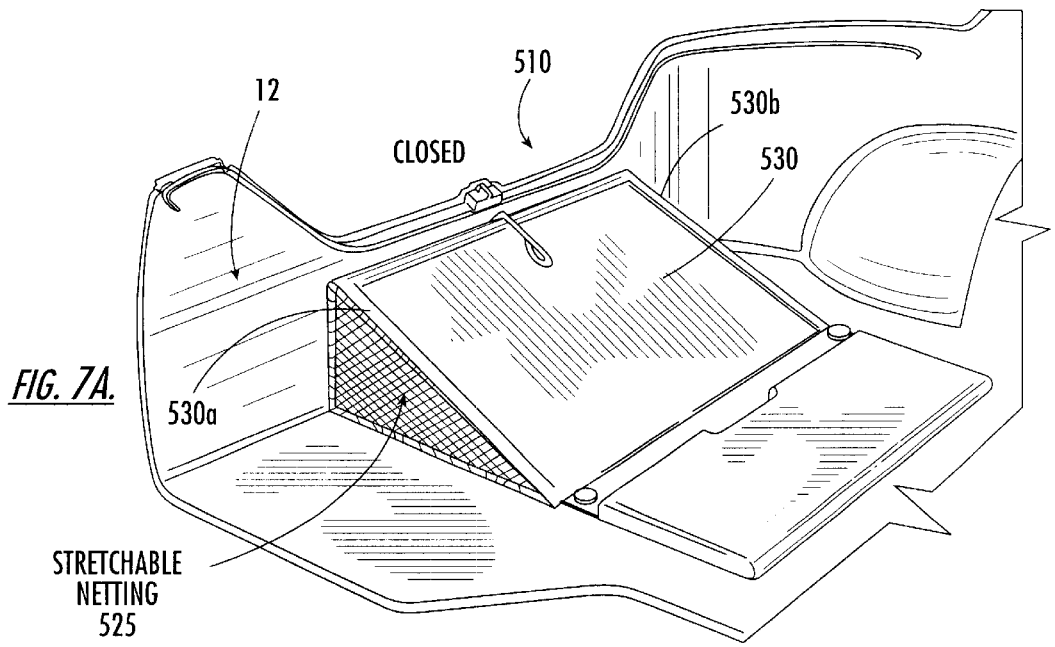
Figure 7B:
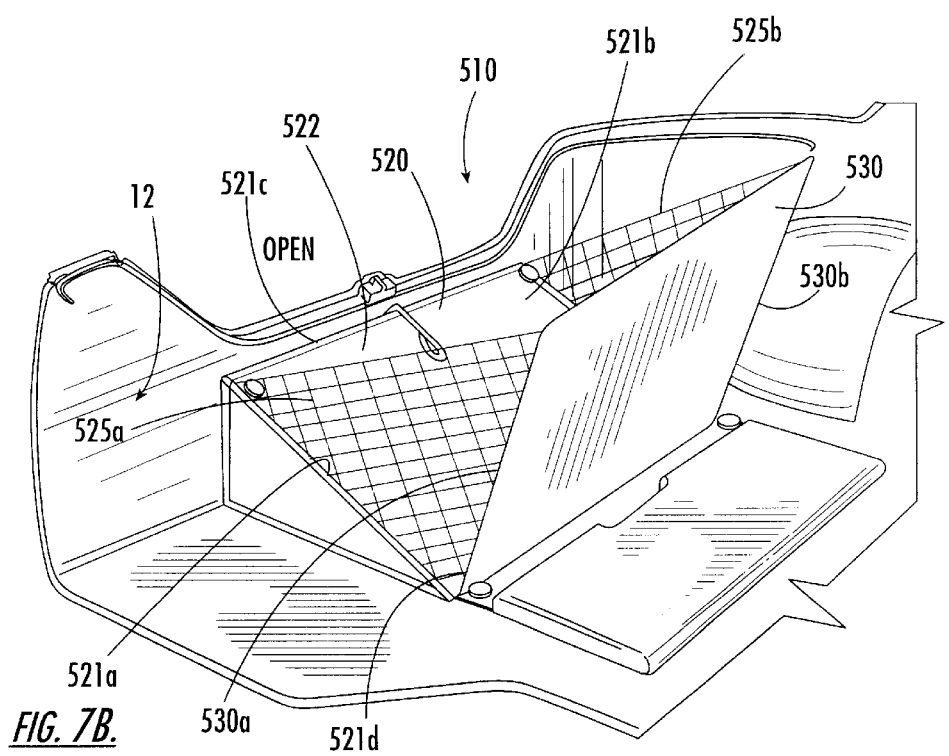

Referring now to FIGS. 7A–7B, a collapsible storage apparatus 510 for storing items within a vehicle compartment, according to other embodiments of the present invention, is illustrated. The apparatus 510 includes a base 520 disposed on the floor 14 of a vehicle compartment 12. The base 520 includes opposite first and second end portions 521a, 521b, opposite first and second edge portions 521c, 521d, and a surface 522 exposed to the vehicle compartment 12. Elastic cargo netting 525a, 525b extends from the base surface 522 adjacent the respective first and second end portions 521a, 521b and is attached to a panel 530.

The panel 530 is pivotally attached to the base 520 and includes opposite first and second end portions 530a, 530b. The panel first and second end portions 530a, 530b are connected to the elastic cargo netting 525a, 525b. The panel 530 is movable between a closed position in overlying, face-to-face relation with the base surface 522 (FIG. 7A) and an open position disposed substantially transverse to the base surface 522 (FIG. 7B). The base 522, elastic cargo netting 525a, 525b, and panel 530 define one or more storage compartments for receiving items therein.

Embodiments of the present invention are not limited to elastic cargo netting. Various types of elastic material may be utilized.

Figure 8A:
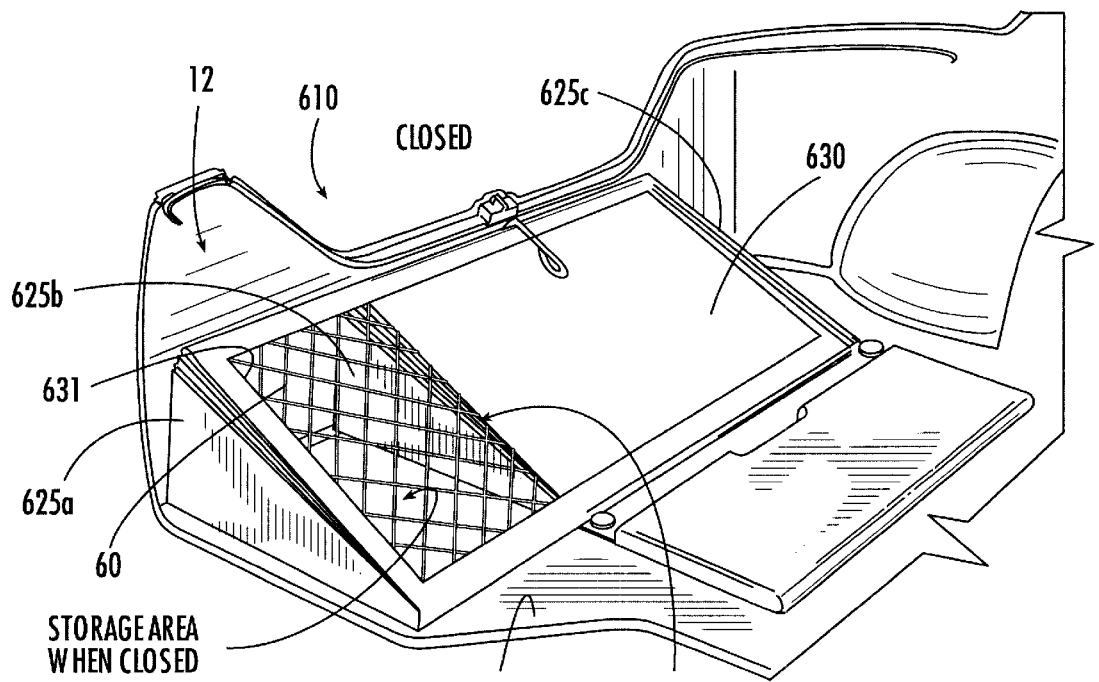
Figure 8B:
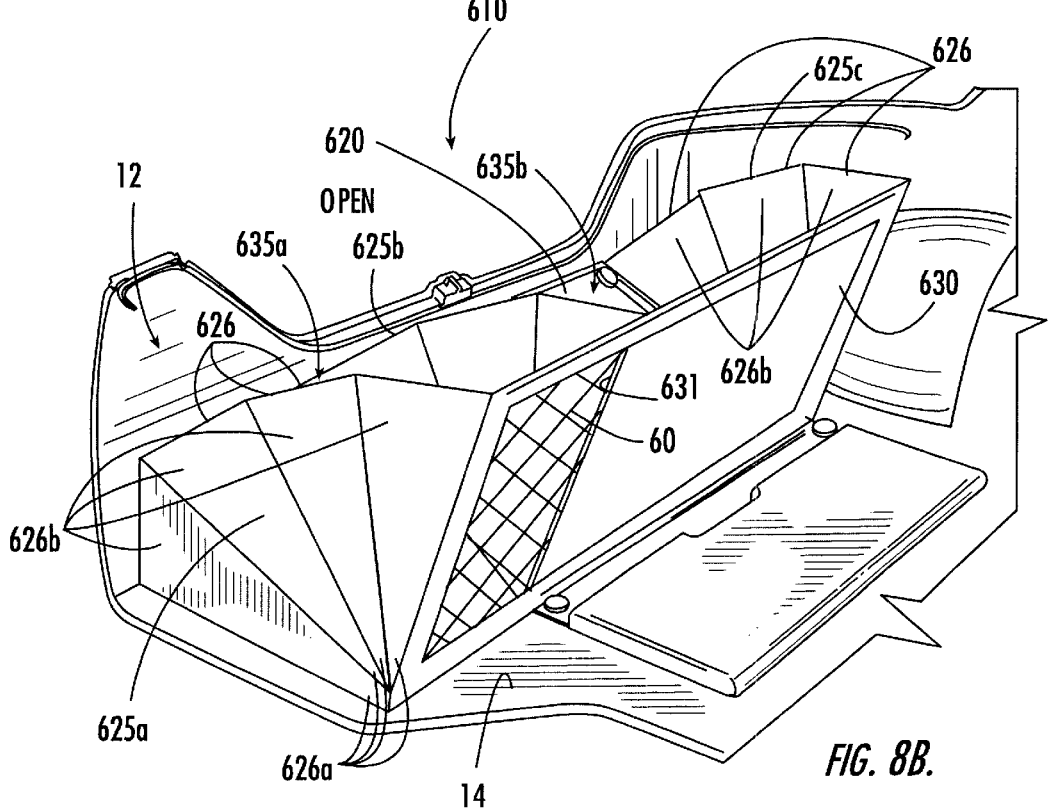

Referring now to FIGS. 8A–8B, a collapsible storage apparatus 610 for storing items within a vehicle compartment 12, according to other embodiments of the present invention, is illustrated. The apparatus 610 includes two compartments 635a, 635b in which items can be stored. The first compartment 635a is defined by the vehicle floor 14, a pair of expandable walls 625a, 625b, and panel 630. The portion of panel 630 overlying compartment 635a includes an aperture 631 formed therethrough with cargo netting 60 overlying the aperture 631. The second compartment 635b is defined by base 620, a pair of expandable walls 625b, 625c, and panel 630.

The illustrated expandable walls 625a, 625b, 625c each include a plurality of members 626 pinned together at a first end 626a and having opposite free ends 626b. The members 626 of each expandable wall 625a, 425b are configured to move from a stacked relationship (FIG. 8A) to a fanned relationship (FIG. 8B) when the panel 630 is moved from a closed position (FIG. 8A) to an open position (FIG. 8B) as described above.

Embodiments of the present invention are not limited to the illustrated expandable walls 625a, 625b, 625c. Expandable and collapsible walls of various types and configurations may be utilized (e.g., telescoping walls; walls having accordion-type bellows; etc.).

Referring to FIG. 9, an apparatus 710 for storing items within a vehicle compartment 12' according to additional embodiments of the present invention is illustrated. The apparatus 710, illustrated in FIG. 9 in an open position, includes a rear panel 730 that is pivotally attached within the vehicle compartment 12' (e.g., attached to a base or floor covering or floor) and that defines a storage compartment 735 in conjunction with the floor (or base or floor covering). A biasing device 713 is attached to the rear panel 730 and to the vehicle floor (or other portion of the vehicle compartment 12') and is configured to urge the rear panel 730 to the open position. The illustrated biasing device 713 is a telescoping strut (e.g., gas, hydraulic) of the type utilized in the automotive industry for supporting hatchback doors, hoods, and the like. Telescoping struts are well understood by those skilled in the art and need not be described further herein. The illustrated biasing device 713 may also serve the function of a locking member configured to releasably retain the rear panel 730 in the open position. Alternatively, the biasing device 713 may be configured to urge the rear panel 730 from an open position to a closed position and to help maintain the rear panel 730 in a closed position.

It is to be understood that additional biasing devices may be utilized that serve the same or different functions. For example, one or more biasing devices may be provided to urge the rear panel 730 to an open position, and one or more biasing devices may be provided to urge the rear panel 730 to a closed position.

Various types of biasing devices may be utilized in accordance with embodiments of the present invention. Embodiments of the present invention are not limited to telescoping struts. Springs, dampeners, and other known biasing devices may also be utilized, without limitation.

The apparatus 710 of FIG. 9 also includes flexible material 715 attached to the vehicle floor (or base or floor covering) and to the front side 732 of the rear panel 730 that divides the storage compartment 735 into multiple sections 735a, 735b, 735c when the rear panel 730 is moved to the open position. An exemplary flexible material 715 may be cargo netting. However, embodiments of the present invention are not limited to cargo netting. Various types of materials may be utilized, without limitation.

Figure 10A:
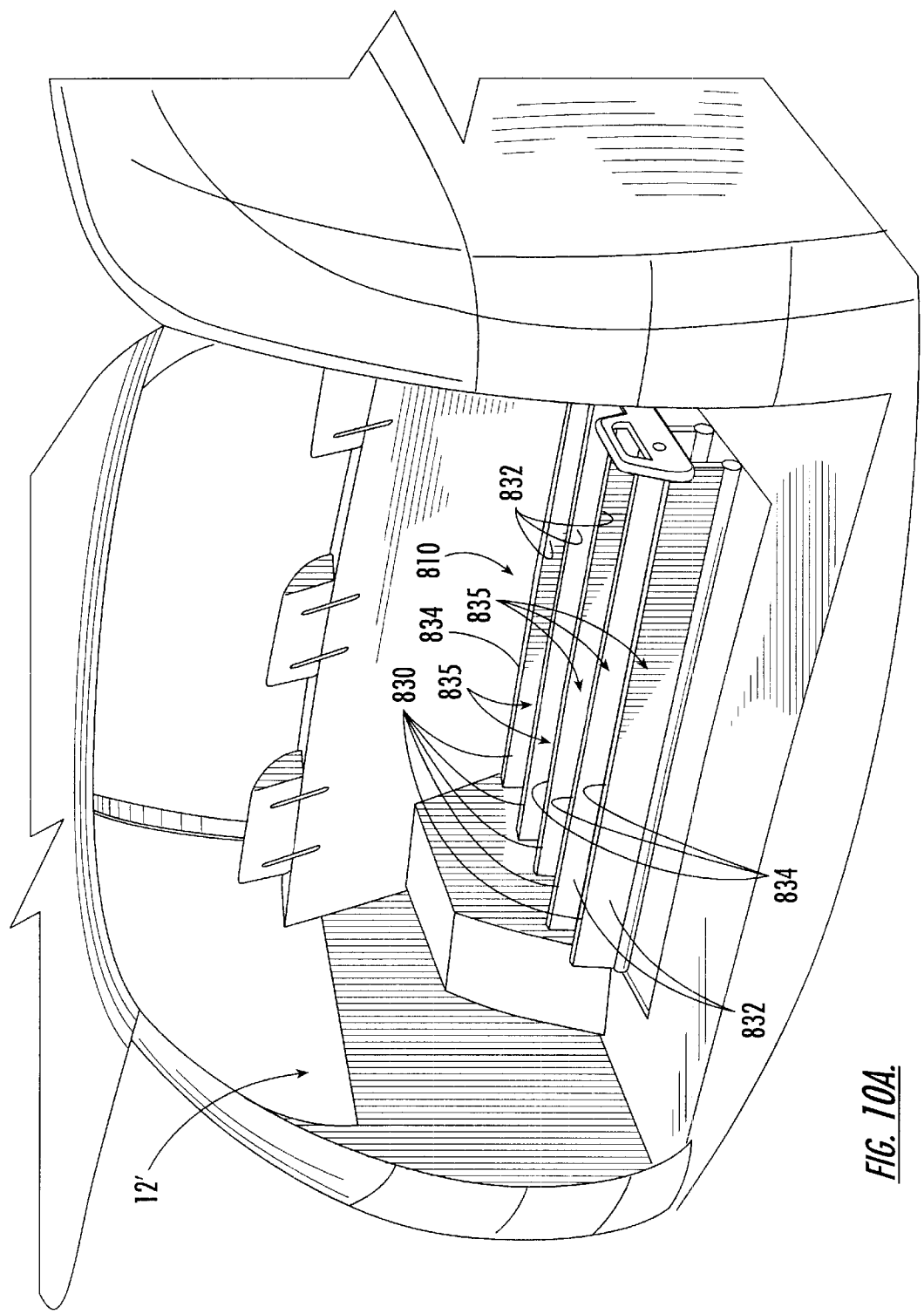
FIG. 10A is a perspective view of a collapsible storage apparatus for storing items within a vehicle compartment, according to additional embodiments of the present invention.
Figure 10B:
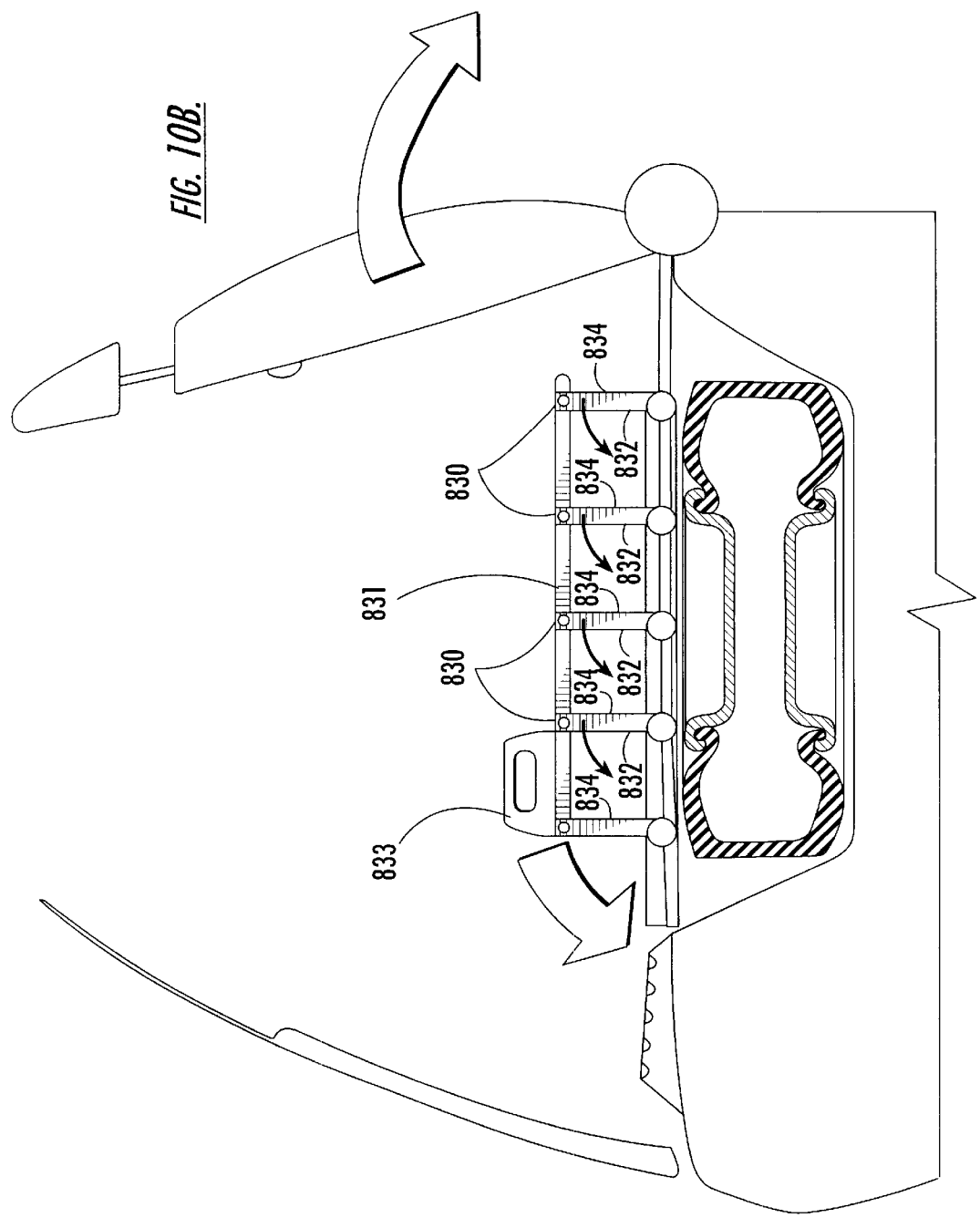
FIG. 10B is a side view of the collapsible storage apparatus of FIG. 10A.

Referring to FIGS. 10A–10B, an apparatus 810 for storing items within a vehicle compartment 12, according to additional embodiments of the present invention is illustrated in an open position. The apparatus 810, illustrated in FIGS. 10A–10B in an open position, includes a plurality of elongate panels 830 pivotally attached within the vehicle compartment 12' (e.g., attached to a base or floor covering or floor) in adjacent, spaced-apart-relationship, and that define a plurality of storage compartments 835 in conjunction with the floor (or base or floor covering). The illustrated panels 830 are in substantially parallel, spaced-apart relationship.

Each panel 830 includes opposite front and rear sides 832, 834. The panels 830 are collectively movable between closed and open positions. In the closed position, the front side 832 of each panel 830 is in overlying, face-to-face relation with the vehicle floor (or base or floor covering). In the open position, the panels 830 are collectively disposed substantially transverse (e.g., normal) to the vehicle floor (or base or floor covering) to define a plurality of storage compartments 835 for receiving items therein.

In the illustrated embodiment, the panels 830 are collectively movable between a closed and open position via a member 831 that is movably mounted to each panel 830. In the illustrated embodiment, member 831 is movably attached to each panel 830 adjacent a respective end portion thereof. However, it is understood that member 831 may be movably attached to each panel 830 in various locations. Moreover, member 831 may have various configurations. A handle 833 is attached to the member 831 and is configured to be grasped by a user to move the member 831 to thereby collectively move the panels 830 between closed and open positions.

According to additional embodiments of the present invention, at least one biasing device (not shown) may be attached to one or more of the panels 830 that is configured to urge the panels 830 to the open position. In addition, a floor covering may be disposed on the vehicle compartment floor. The same floor covering may be disposed on the rear side 834 of one or more of the panels 830 such that the apparatus 810 has an integral look with the vehicle compartment 12' when the panels 830 are collectively in the closed position.

Figure 11A:
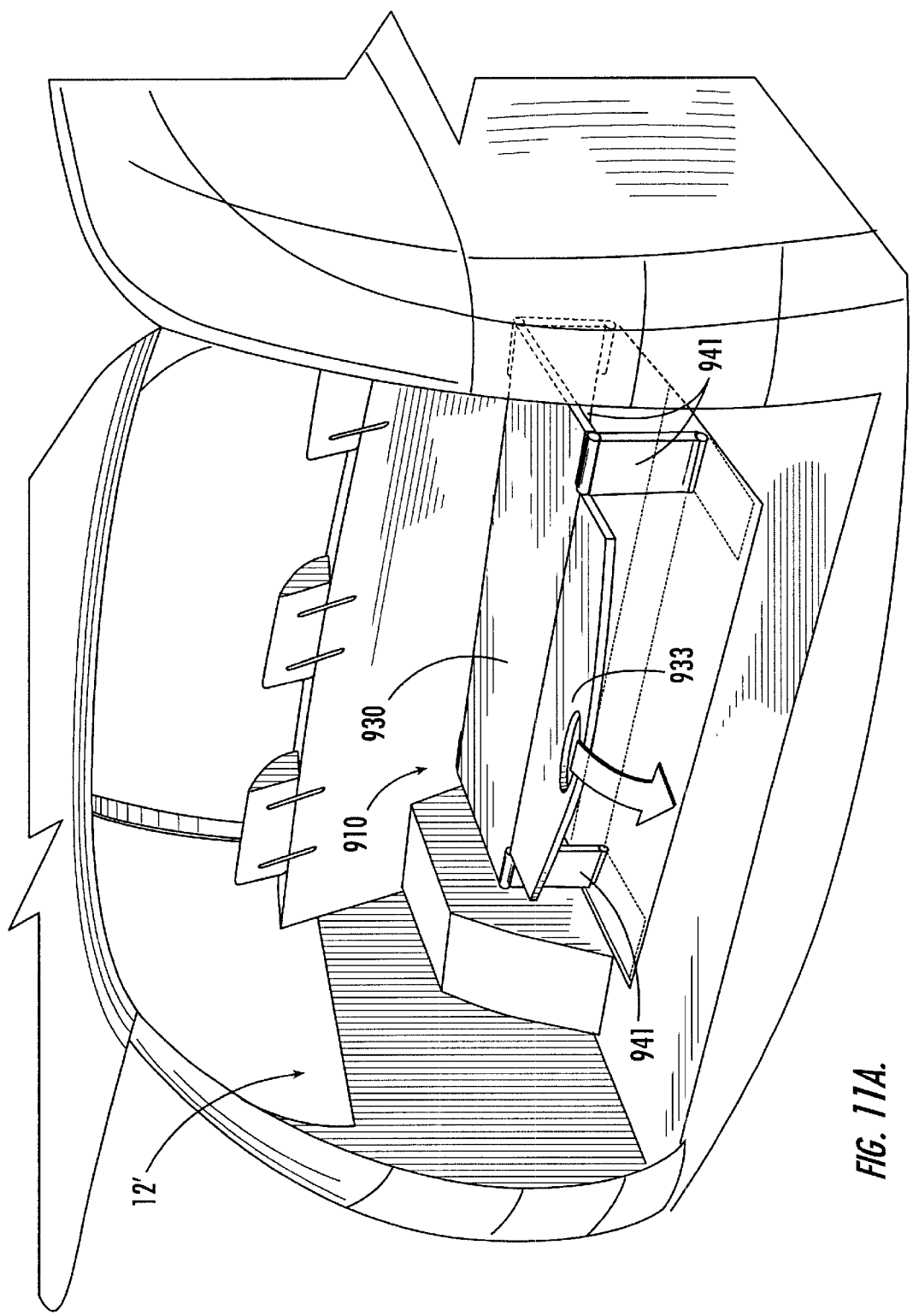
FIG. 11A is a perspective view of a collapsible storage apparatus for storing items within a vehicle compartment, according to additional embodiments of the present invention.

Referring to FIGS. 11A–11B, an apparatus 910 for storing items within a vehicle compartment 12' according to additional embodiments of the present invention is illustrated. The apparatus 910 includes an elongate panel 930 pivotally attached to the vehicle compartment floor (or floor covering or base) via leg members 941. The panel 930 is movable between a stored position in face-to-face, substantially contacting relation with the floor (or base or floor covering) and an operative position wherein the panel 930 is in spaced-apart, face-to-face relation with the floor (or base or floor covering). In the operative position, the panel 930 can serve the function of a table and/or shelf. In the illustrated embodiment, a handle 933 is connected to the panel 930 and is configured to be grasped by a user and to move the panel 930 between the stored and operative positions.

Referring to FIGS. 12A–12B, 13A–13B, 14A–14B, and 15, various embodiments of a collapsible storage apparatus 1010 for storing items within a vehicle compartment are illustrated. In each of the illustrated embodiments, the respective apparatus 1010 includes a plurality of walls 1030 that are pivotally attached to the floor of a vehicle (or to a base or to a floor covering). The walls 1030 are configured to overlie the floor (or base or floor covering) in a folded, flat configuration, and to unfold into one or more storage compartments 1035 for receiving items therein. In each of the illustrated embodiments, a handle 1033 is connected to one of the walls 1030 and is configured to be grasped by a user and used to unfold one or more of the various walls 1030 into one or more storage compartments 1035.

Each of the storage apparatus embodiments described and illustrated herein may be portable such that they can be easily placed within a vehicle compartment and removed therefrom. Although embodiments of the present invention have been described and illustrated with respect to installation within the trunk of an automobile, it is understood that apparatus according to embodiments of the present invention can be installed in various other compartments and areas of various types of vehicles.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for storing items within a vehicle compartment, wherein the vehicle compartment includes a floor, the apparatus comprising:

a base disposed on the floor, comprising opposite first and second end portions, opposite first and second edge portions, and a surface exposed to the vehicle compartment;

first and second expandable walls extending from the base surface adjacent the respective first and second end portions; and a panel pivotally attached to the base and comprising opposite first and second end portions, wherein the first and second end portions of the panel are connected to the respective first and second expandable walls, wherein the panel is movable between a closed position in overlying, face-to-face relation with the base surface and an open position disposed substantially transverse to the base surface, wherein the first and second expandable walls each comprise a plurality of members configured to move from a stacked relationship to a fanned relationship when the panel is moved from the closed position to the open position, and wherein the base, first and second expandable walls and panel define one or more storage compartments for receiving items therein.

2. The apparatus of claim 1, further comprising at least one biasing device attached to the panel that is configured to urge the panel to the open position.

3. The apparatus of claim 1, wherein the panel comprises an aperture formed therethrough, and further comprising cargo netting overlying the aperture.

4. The apparatus of claim 1, further comprising a locking member configured to releasably secure the panel in the open position.

5. The apparatus of claim 1, wherein the expandable walls comprise cargo netting.

* * * * *